Patented Apr. 24, 1951

2,550,659

UNITED STATES PATENT OFFICE 2,550,659

PROCESS FOR PRODUCING MELAMINE

Raymond A. Vingee, Stamford, Conn., assignor to Allied Chemical & Dye Corporation, a corporation of New York No Drawing. Application May 9, 1947,
Serial No. 747,137

6 Claims. (Cl. 260—249.7)

This invention relates to processes for the production of melamine and more particularly to processes for producing melamine from reactants comprising urea.

An object of the invention is to obtain melamine in good yields from urea or from reaction charges including urea as one reactant.

Another object is to obtain melamine from reactants comprising urea under relatively mild conditions of temperature, pressure, and time of reaction.

A third object is to provide a catalyst for the formation of melamine from reactants comprising urea.

Other objects and advantages of my invention will appear hereinafter.

In the formation of melamine from urea or from reactants comprising urea, I have found that the reaction is catalyzed by addition of minor proportions of at least one strong, stable mineral acid, or salt or anhydride thereof, which contains an element of atomic number 15 to 17, inclusive. The material to be added is thus one of the acids phosphoric, sulfuric, or hydrochloric, or a salt or anhydride thereof, or a mixture of these materials. The acids of this group are strong mineral acids stable at elevated temperatures and stable to oxidation. The materials which may be used to catalyze the reaction forming melamine, in accordance with my invention, include meta- and pyrophosphoric acids and their salts and meta- and pyrosulfuric acids and their salts as well as the ortho-compounds.

Some suitable conditions of temperature, pressure, etc. for heating urea to form melamine therefrom are known. I believe, however, I am the first to discover the catalytic effect on these reactions of the materials herein described. Accordingly, my invention is directed to processes employing those materials as catalysts added to urea which is heated under any conditions under which melamine is formed from the urea. Use of the catalysts to which my invention is directed promotes the reaction of urea to form melamine under milder conditions of temperature, pressure and reaction time than would be required in the absence of a catalyst. In its preferred aspects processes embodying my invention employ those milder conditions. Accordingly, without limiting the invention thereto, the preferred conditions for employing my catalysts will be described hereinafter.

The catalysts which are added to the reactants comprising urea in accordance with my invention are usually added in amounts of a few mol percent of the reactants charged but larger amounts are also operative and with the more active catalysts small amounts of less than 1 mol percent of the charge show strong catalytic effects. A practical maximum for the amount of added catalyst is about 10 mol percent on the reactants charged. Suitably about 0.01 to 5 mol percent may be used.

The catalysts of my invention include the organic salts of the above inorganic acids as well as the inorganic salts. For example, the guanidine salt of the catalytic acid may be formed in situ during the reaction, e. g. by action of the reaction mixture on some or all of a catalytic acid, or on an ammonium salt or an anhydride thereof, added at the start; and the guanidine salt thus formed will function as a catalyst; or I may add at the start as a catalyst a guanidine salt of one of the above acids.

It is not essential that the catalytic substances added to the charge in accordance with my invention should dissolve completely in the reaction mixture at any time during the reaction. I have obtained good catalytic effect from compounds which do not dissolve appreciably in the reaction mixture during the course of the reaction. However, if the substance added as a catalyst does not pass into solution, the catalytic substance should be added in a form to present a large surface area at which catalytic action may occur.

Preferred catalysts are those which are soluble to the extent of at least 1% by weight in water at 20° C. since these compounds have high activity and may be separated as water solutions from melamine.

Materials especially preferred for use in chrome-nickel stainless steel reactors are those which contain the phosphate anion since the phosphate anion is associated with a high catalytic activity and also exerts a very marked protective effect against corrosion of the stainless steel by the reaction mixtures employed in my process. Phosphates which are soluble in the reaction mixture at reaction temperature are especially suitable as catalysts and corrosion inhibitors. In particular, nitrogen-containing salts such as ammonium or guanidine salts of phosphoric acids are preferred substances to be added as such to the charge or to be formed in situ. For example, if diammonium hydrogen phospate, $(NH_4)_2HPO_4$, is added in small amounts to reactants comprising urea and the reaction is carried out in a chrome-nickel steel reactor, not only is the reaction catalytically promoted but also the corrosion of the reactor by the reaction mixture is markedly less than would occur under conditions identical except for the initial presence of another catalyst instead of a phosphate.

Diammonium hydrogen phosphate is a preferred material to be added at the start to a charge of reactants comprising urea to obtain catalysis of the conversion and inhibition of corrosion in a chrome-nickel steel converter. Preferred amounts of this material based on the mols of reactants in the charge are about 0.2 to 2 mol percent.

The following examples illustrate my invention, but it is not intended that these examples should limit the scope of the invention.

The apparatus used in Examples 1–3 below was a heavy walled glass autoclave tube placed within a glass tube which was electrically heated by a Nichrome winding and was insulated by an outer glass tube. A thermocouple beside the autoclave tube was used for measuring the temperature. In Example 4 illustrating corrosion inhibition combined with catalysis the apparatus was an electrically heated 18–8 chrome-nickel stainless steel autoclave provided with a thermocouple well along the longitudinal axis for measuring the reaction temperature.

The method of operation was to charge a weighed amount of urea and the substance added as a catalyst to the autoclave and heat the autoclave rapidly to reaction temperature. After the desired reaction period at reaction temperature the autoclave was allowed to cool and was then opened. The reaction time recorded is the time at reaction temperature.

Melamine of about 90–100% purity was recovered from the products by driving off ammonium carbamate at 100° C. to a condenser, digesting the residue in a quantity of hot water moderately in excess of that required to dissolve a like amount of melamine, filtering off the hot water-insoluble portion (mostly ammelide plus ammeline) and crystallizing melamine from the filtrate by cooling. Melamine was identified by crystal form, solubility properties, melting behavior, elementary analysis, and preparation and analysis of the oxalate and the picrate.

*Example 1.*—6.6 grams of urea per 100 cc. of reaction space to which 4.25 weight percent (i. e. about 1.9 mol percent) based on the urea of $(NH_4)_2HPO_4$ was added, was heated in a sealed glass reactor at 350–360° C. for 0.5 hour. At the end of this time the charge was completely liquid. The ultimate pressure of gaseous urea decomposition products developed under the reaction conditions was approximately 1500 p. s. i. The yield of melamine recovered in mol percent of the input urea was 43.5 mol percent. The mol ratio of $(NH_4)_2HPO_4$ to urea was 0.019:1.

*Example 2.*—Adding to the urea 4.1 weight percent ammonium sulfate or 1.5 weight percent ammonium chloride (corresponding to a mol ratio of ammonium sulfate to urea of 0.019:1 and of ammonium chloride to urea of 0.017:1) and heating the urea containing these catalysts as in Example 1 for 0.8 and 0.5 hour, respectively, gave substantially the same results as obtained in Example 1 using $(NH_4)_2HPO_4$.

Under the same conditions except that added catalysts were absent, no melamine was formed in 0.5 hour reaction time. A good yield of melamine may be obtained on heating for 0.5 hour in a glass reactor in absence of an added catalyst only under much increased pressure of gaseous urea decomposition products as compared to the above (e. g., about 9000 p. s. i.) or at considerably higher temperature than above (e. g. 400° C.).

*Example 3.*—13.8 grams of urea per 100 cc. of reaction space to which was added 4.6 weight percent of $Mg_3(PO_4)_2.4H_2O$ (about a 0.008:1 mol ratio of $Mg_3(PO_4)_2$:urea) was heated in a glass reactor as in Example 1 for 0.75 hour at 350–360° C. The charge quickly melted to a slush, then solidified, and finally liquefied to a slurry. The ultimate pressure of urea decomposition products developed under these conditions was about 3000 p. s. i. The yield of melamine recovered was 41.6 mol percent on the input urea. In the absence of the catalyst no melamine was obtained under conditions otherwise the same.

Magnesium sulfate added in an amount of 5 weight percent (4.1 mol percent) to the urea charged under similar conditions of temperature and pressure (350–360° C. and about 2800 p. s. i.) led to a 40.6 mol percent yield of melamine on the input urea after heating 0.5 hour at reaction temperature. Likewise when ammonium chloride (1.7 mol percent on the urea) was substituted for the magnesium phosphate of Example 3, a 43 mol percent yield of melamine was obtained on heating for 0.37 hour at 350°–360° C. under an ultimate pressure of about 2900 p. s. i. Diammonium hydrogen phosphate (0.19 mol percent on the urea) similarly substituted for the magnesium phosphate of Example 3 gave a 41.6 mol percent yield of melamine on the urea on heating for 0.7 hour at 350–360° C. and at an ultimate pressure of about 2800 p. s. i.

Among other compounds which have been substituted for the above compounds in carrying out the procedure of the above examples and found catalytically active to promote the formation of melamine are guanidine phosphate, phosphoric anhydride, and metaphosphoric acid.

*Example 4.*—A charge of urea to which had been added 4.25 percent by weight (about 1.9 mol percent) of diammonium hydrogen phosphate was heated in an autoclave at 345°–365° C. in the presence of 18–8 chrome-nickel steel. After the first hour the loss of weight of the steel sample corresponded to a penetration of 0.75 inch per year, and corresponded to zero penetration in the succeeding eighteen hours. The yield of melamine in mol percent on the input urea obtained by this procedure was 50 mol percent. The crude product formed in the presence of the added phosphate was much less discolored and contaminated by corrosion products than products formed under similar conditions but in the absence of added phosphate.

When no diammonium hydrogen phosphate was added the penetration of the steel in the first hour under the conditions of the above example corresponded to 2.24 inches/year, and in the succeeding 18 hours corresponded to 0.10 inch/year.

I have found cyclic pyrolysis products of a lower degree of amination than melamine are formed during the pyrolysis of urea and are ultimately converted to melamine. For example, a mixture of ammelide and ammeline may be isolated, in yields which decrease as melamine increases during the heating period. Thus, although in the above examples urea is the original reactant, instead of starting with urea one may start with a reaction mixture comprising urea and oxygen-containing cyclic products of urea pyrolysis, e. g., cyanuric acid, ammelide or ammeline; or one may start with urea and a compound such as cyanic acid from which one or more of the above condensation products are formed on heating. Under the reaction conditions described herein as suitable for treating urea in accordance with my invention, mixtures initially containing urea and an oxygen-containing cyclic product of urea pyrolysis as the reactants may be pyrolyzed to melamine in accordance with my invention. About one mol of urea is consumed in converting each mol of hydroxyl radical in the above cyclic compounds to an amino radical.

It is not necessary that the reactants specified for my process be charged as such to the reactor. They may instead be formed in situ from other reactants, and in this case their formation often will be only transitory. For example, cyanic acid and ammonia may be employed as reactants instead of urea, since these compounds can react on heating to form urea or its initial decomposition products. Biuret, which gives essentially the same initial decomposition products on heating as does urea, may likewise replace urea in my process. Thus, I intend to include within the scope of the term "reactants comprising urea" those reactants such as cyanic acid plus ammonia, or biuret, which form urea (at least transitorily) on heating.

The foregoing examples illustrate the use of various catalysts in carrying out my invention. Conditions which exert an important influence on the yield of melamine from urea are reaction temperature, time of reaction, and pressure of ammonia and carbon dioxide in the atmosphere over the charge.

A temperature of about 300° C., I have found, is sufficient to obtain satisfactorily rapid and complete conversion of urea to melamine with gas pressures in the reactor within the ranges discussed below, when certain materials which catalyze the urea conversion reactions are present. But higher temperatures, e. g. 350°–450° C. are preferred. A particularly preferred operating temperature is about 350°–360° C. When the temperature is too low in relation to the pressure and the heating time, the urea tends to form oxygen-containing cyclic products rather than melamine.

Besides being affected by reaction temperature, the yield of melamine obtained in the pyrolysis of urea is also influenced by the pressure of the gaseous urea decomposition products in the atmosphere over the charge. These products are chiefly ammonia and carbon dioxide (formed from urea as the pyrolysis proceeds in mol ratios varying from about 4:1 to about 1:1 of $NH_3:CO_2$). When the reaction is carried out in a sealed vessel, the pressure of ammonia and carbon dioxide depends on the amount of reactant material introduced originally into the closed vessel, since this figure determines both the quantity of each gas ultimately formed and the available space in the gas phase. In the examples above I have specified the amount of reactant (urea) introduced in the vessel in terms of grams of urea charged per 100 cc. of space in the reaction vessel. I have found that with the other conditions constant, the yield of melamine reaches an optimum as the value for the ultimate pressure of the gaseous decomposition products of urea (ammonia and carbon dioxide) reached during the urea decomposition reaction increases.

At any given temperature, increasing pressures of $NH_3+CO_2$ favor the reaction $$2NH_3 + CO_2 \rightarrow NH_2CONH_2 + H_2O$$

Water, if present, can hydrolyze melamine. The reaction of ammonia and carbon dioxide forming water is favored thermodynamically as temperature decreases so that as the reaction mixture is cooled, a temperature will be reached, higher the higher the pressure of ammonia and carbon dioxide, at which the formation of water occurs to an appreciable extent. If the pressure of $NH_3$ and $CO_2$ is high and such that the $NH_3$ and $CO_2$ can combine appreciably in the condensed phase at temperatures of 200° C. and above, then hydrolysis of melamine by the water formed will be correspondingly rapid during cooling of the products, and will reduce the ultimate melamine yield.

Rapid cooling of the products is accordingly advantageous to avoid loss of melamine, whenever appreciable water is present. If the apparatus allows reducing the pressure of the gases formed before the products are cooled, the formation of water at elevated temperature by combination of $NH_3+CO_2$ may be prevented and the hydrolysis of melamine from this cause can then be practically eliminated. The same is true if the pressure of the gases formed is always low enough so that no combination in the condensed phase of $NH_3+CO_2$ occurs except at relatively low temperatures, say below about 200° C. On the other hand, when the ultimate pressure of ammonia and carbon dioxide developed in the reaction is too low, deammoniation of melamine to melam, etc., may occur and reduce the melamine yield.

Thus, the optimum pressure of ammonia and carbon dioxide will vary with the precise manner of conducting the reaction and the subsequent cooling of the product. The precise choice of pressure is not highly critical, but in general a pressure of about 1000–3000 pounds per square inch of $NH_3$ and $CO_2$ is preferred at the preferred temperature of about 350–360° C. In the presence of a catalyst, I have employed successfully a pressure of $NH_3$ plus $CO_2$ as low as about 350 pounds per square inch at a reaction temperature of about 350° C.

The pressure of $NH_3+CO_2$ under which these gases combine at the temperature of reaction sets a maximum pressure of $NH_3+CO_2$ for the process. This pressure is higher, the higher the reaction temperature employed. At 350°–400° C., it is of the order of 10,000 atmospheres. The practical upper limit of pressure of $NH_3+CO_2$ is that which the equipment will stand. An $NH_3+CO_2$ pressure as high as 10,000 p. s. i. I have found to give satisfactory results in the process of my invention. The minimum pressure giving satisfactory results appears to depend somewhat on temperature; thus a higher pressure, or loading density, is required for satisfactory yield of melamine at 300° C. than at 400° C. reaction temperature, other things being equal. The preferred minimum pressure for temperatures in the preferred range (above about 300° C.) is about 1,000 p. s. i. of ammonia and carbon dioxide.

In the usual manner of operating my invention I obtain the required pressure of gaseous urea decomposition products (chiefly ammonia and carbon dioxide) by the formation of these gases from the reaction mixture as reaction proceeds. At the beginning of a batchwise reaction the pressure of the gaseous urea decomposition products is below the above prescribed values. However, it is not necessary that the ammonia and carbon dioxide pressure exceed a particular value throughout the reaction: the values discussed above are those which should eventually be reached during the course of the reaction in order to obtain good yields of malamine.

It is not essential that all the gases present be derived from the decomposition of the urea reactant. For example if desired, $NH_3$ or $CO_2$ or both introduced into the reactor from an external source may be used in place of or in addition to the $NH_3$ or $CO_2$ or both formed by decomposition of the urea reactant to maintain the desired pressure over the charge. An inert gas may be present over the charge in addition to $NH_3$ and $CO_2$.

Furthermore, the ratio of $NH_3$ to $CO_2$ present over the charge need not be such ratios as may be formed by the decomposition of the urea reactants. Ammonia or carbon dioxide or both may be added from some other source or removed from the atmosphere over the charge so as to establish a different ratio of these gases present over the charge than would result from urea decomposition alone.

But preferably the ratio of $NH_3$ to $CO_2$ is maintained within the range of ratios normally resulting from the decomposition of the urea during the reaction. This range, I have found, is from about 4:1–1:1 mol ratio of $NH_3:CO_2$, and when the urea decomposes to melamine, ammonia and carbon dioxide in theoretical yields the ratio of $NH_3:CO_2$ formed, I have found, is about 2:1. This ratio of about 2:1 for $NH_3:CO_2$ represents a particularly preferred ratio of these gases over the charge according to my invention. Even if added $NH_3$ or added $CO_2$ or other added gas is present over the charge, the partial pressure of $NH_3$ (present from any source) should preferably reach at least about 650 p. s. i. during the reaction and the partial pressure of $CO_2$ (present from any source) should preferably reach at least about 300 p. s. i. during the reaction. These figures correspond to the preferred minimum pressure of about 1,000 p. si. i. of the gaseous urea decomposition products obtained when the conversion of urea to melamine, ammonia and carbon dioxide approaches the theoretical.

The minimum time of heating to reach satisfactory conversion to melamine is influenced by temperature, pressure of $NH_3$ and $CO_2$, and presence or absence of catalysts.

For example, with temperatures in the lower region of the preferred range, e. g., about 300° C., and with a moderate pressure of about 5,000 p. s. i. eventually developed during a batch reaction in a stainless steel autoclave, the yield of melamine reaches approximately its maximum value after about six hours of heating the urea charge. But at 350° C., under conditions otherwise the same, the reaction goes virtually to completion after 0.5 hour heating. When a high pressure of the $NH_3$ and $CO_2$ gaseous products (about 10,000 p. s. i.) is developed at reaction temperatures of about 350° C., the yield of melamine from urea reaches more than 80% of its maximum value in about one minute at reaction temperature. The preferred conditions comprise a heating time of the order of fifteen minutes, in a chrome-nickel steel autoclave at about 350–360° C. under about 1000–3000 p. s. i. pressure of urea decomposition products.

The time of heating may far exceed the minimum necessary for satisfactory conversion without any great deleterious effect on the melamine yield. Thus, as long as the time is sufficient for substantial conversion of the reactants to melamine under the conditions of temperature and pressure used, the particular time of heating is not critical. For example, under conditions which give a maximum conversion to melamine in about 0.5 hour, the reactants may be heated for several hours instead of 0.5 hour without much changing the yield of melamine obtained.

Substantial conversion to melamine may be recognized by incipient liquefaction of the reaction mixture at a temperature of 350°–360° C., or by any other desired test for the presence of melamine in the reaction mixture.

I claim:

1. A process for the production of melamine which comprises heating, in absence of substantial amounts of water; reactants comprising urea in a reaction zone to which is added less than 10 mol percent on the reactants of material of the group consisting of phosphoric acid, its salts, and its anhydrides, and mixtures thereof; and continuing to heat the reaction mixture, at a temperature within the range of about 300° C.–450° C. and in contact with an atmosphere containing ammonia and carbon dioxide in which the partial pressure of ammonia and carbon dioxide reaches at least about 1000 p. s. i. during the reaction, until at least a substantial portion of the reaction mixture its converted to melamine.

2. The process of claim 1 in which the material added to the reaction zone dissolves at reaction temperature in the reaction mixture and in which urea is the principal reactant charged.

3. The process of claim 1 in which a phosphate which dissolves at 20° C. to the extent of at least 1 percent by weight in water is the material added to the reaction zone and in which urea is the principal reactant charged.

4. The process of claim 1 in which a nitrogen-containing salt of a phosphoric acid is the material added to the charge and in which urea is the principal reactant charged.

5. The process for the conversion of urea to melamine which comprises charging urea as the sole reactant to a chrome-nickel steel converter, adding to the charge about 0.01 to 5 mol percent of a phosphate soluble in the charge at reaction temperature and heating the charge in the absence of substantial amounts of water at about 350°–360° C. and under a pressure of the gaseous decomposition products of urea of about 1000–3000 p. s. i. for a time sufficient to develop a pressure of at least 1000 p. s. i. by decomposition of the urea reactant and to convert at least a substantial proportion of the urea to melamine.

6. The process of claim 5 in which about 0.2–2 mol percent of diammonium hydrogen phosphate is added to the charge and in which the time of heating is at least about 15 minutes.

RAYMOND A. VINGEE.

REFERENCES CITED

The following references are of record in the file of this patent:

UNITED STATES PATENTS

| Number | Name | Date |
|---|---|---|
| 1,951,518 | Meiser | Nov. 20, 1934 |
| 2,087,591 | Buc | July 20, 1937 |
| 2,129,689 | Hetherington | Sept. 13, 1938 |
| 2,297,034 | Strzyewski | Sept. 29, 1942 |